United States Patent
Tsfaty et al.

(10) Patent No.: US 9,912,415 B2
(45) Date of Patent: Mar. 6, 2018

(54) FAST SERVICE DISCOVERY AND PAIRING USING ULTRASONIC COMMUNICATION

(71) Applicant: QUALCOMM Incorporated, San Diego, CA (US)

(72) Inventors: Yossi Tsfaty, Rishon Le Zion (IL); Nathan Altman, Raanana (IL); Gilad Bornstein, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 14/078,338

(22) Filed: Nov. 12, 2013

(65) Prior Publication Data

US 2015/0131539 A1    May 14, 2015

(51) Int. Cl.
| | |
|---|---|
| *H04B 11/00* | (2006.01) |
| *H04W 76/02* | (2009.01) |
| *H04W 8/00* | (2009.01) |
| *G01S 5/18* | (2006.01) |

(52) U.S. Cl.
CPC ............... *H04B 11/00* (2013.01); *G01S 5/18* (2013.01); *H04W 8/005* (2013.01); *H04W 76/02* (2013.01)

(58) Field of Classification Search
CPC .................................. G01S 5/18; H04B 11/00
USPC ................ 370/336, 338, 254, 252, 465
See application file for complete search history.

(56) References Cited

U.S. PATENT DOCUMENTS

| | | | | |
|---|---|---|---|---|
| 4,078,236 A | * | 3/1978 | Hempell | H03J 9/04 334/8 |
| 4,566,330 A | * | 1/1986 | Fujii | G01N 29/11 73/1.79 |
| 5,216,639 A | * | 6/1993 | Ohtsuki | G01S 15/584 367/90 |
| 5,539,705 A | * | 7/1996 | Akerman | H04B 11/00 367/132 |

(Continued)

FOREIGN PATENT DOCUMENTS

| | | |
|---|---|---|
| CN | 1523777 A | 8/2004 |
| CN | 101286806 A | 10/2008 |

(Continued)

OTHER PUBLICATIONS

ISA/EPO, International Search Report and Written Opinion of the International Searching Authority, Int'l App. No. PCT/US2014/071222, Mar. 4, 2015, European Patent Office, Rijswijk, NL 9 pgs.

(Continued)

*Primary Examiner* — Andrew Lai
*Assistant Examiner* — Andrew C Lee
(74) *Attorney, Agent, or Firm* — Holland & Hart LLP/Qualcomm

(57) ABSTRACT

Methods, systems, and devices are described for service discovery and connection establishment of a point-to-point (e.g., device-to-device) wireless communication. Wireless devices may initiate point-to-point communication utilizing ultrasonic signals. A user may initiate a scan for one device to detect, select, and establish a connection with another device, where the scan utilizes an ultrasonic signal. Once connected, the device may create a profile with one anther and/or wirelessly communicate with one another to, for example, exchange data.

40 Claims, 12 Drawing Sheets

(56) References Cited

U.S. PATENT DOCUMENTS

| | | | | |
|---|---|---|---|---|
| 5,640,144 | A * | 6/1997 | Russo | G08B 13/1427 340/531 |
| 6,052,336 | A * | 4/2000 | Lowrey | G10K 15/02 367/134 |
| 6,404,703 | B1 * | 6/2002 | Burrell | G01S 1/74 367/127 |
| 6,842,460 | B1 * | 1/2005 | Olkkonen | H04W 48/16 370/328 |
| 7,243,233 | B2 | 7/2007 | Kindberg et al. | |
| 7,334,735 | B1 * | 2/2008 | Antebi | G01S 5/22 235/492 |
| 7,570,625 | B1 * | 8/2009 | Ocepek | H04W 12/12 370/310 |
| 7,668,958 | B2 * | 2/2010 | Burr | H04L 45/54 370/236 |
| 7,672,809 | B2 * | 3/2010 | Liitola | G01S 3/808 702/150 |
| 8,312,392 | B2 | 11/2012 | Forutanpour et al. | |
| 8,364,172 | B2 * | 1/2013 | Guanfeng | G01S 5/0018 370/328 |
| 8,570,898 | B1 * | 10/2013 | Kopikare | H04W 84/20 370/254 |
| 8,604,909 | B1 * | 12/2013 | Amir | H04B 10/1149 340/10.1 |
| 8,693,391 | B2 * | 4/2014 | Garcia-Martin | H04L 29/06027 370/328 |
| 9,354,310 | B2 * | 5/2016 | Visser | G01S 3/8006 |
| 2002/0167965 | A1 * | 11/2002 | Beasley | H04L 29/12009 370/465 |
| 2003/0142587 | A1 * | 7/2003 | Zeitzew | G01S 7/52004 367/127 |
| 2004/0162871 | A1 * | 8/2004 | Pabla | H04W 8/005 709/201 |
| 2004/0198240 | A1 * | 10/2004 | Oliveira | H04M 1/03 455/90.1 |
| 2005/0058109 | A1 * | 3/2005 | Ekberg | H04L 29/12113 370/338 |
| 2005/0113110 | A1 * | 5/2005 | Joo | G01S 5/30 455/456.1 |
| 2006/0018295 | A1 * | 1/2006 | Choi | H04W 64/00 370/338 |
| 2006/0023677 | A1 * | 2/2006 | Labrador | H04L 45/42 370/338 |
| 2006/0136544 | A1 * | 6/2006 | Atsmon | A63H 3/28 709/200 |
| 2006/0193270 | A1 * | 8/2006 | Gehasie | H04B 11/00 370/282 |
| 2006/0267772 | A1 * | 11/2006 | Knadle, Jr. | G06K 7/0004 340/572.4 |
| 2007/0121545 | A1 * | 5/2007 | Park | G01S 5/0205 370/329 |
| 2007/0133352 | A1 * | 6/2007 | Kim | G01S 5/18 367/128 |
| 2008/0055548 | A1 * | 3/2008 | Matsuzawa | B06B 1/0603 353/15 |
| 2008/0173717 | A1 * | 7/2008 | Antebi | G01S 5/22 235/439 |
| 2008/0252595 | A1 * | 10/2008 | Boillot | G06F 3/011 345/156 |
| 2009/0066476 | A1 * | 3/2009 | Raheman | G07C 9/00103 340/5.64 |
| 2009/0073942 | A1 * | 3/2009 | Qin | H04W 8/005 370/338 |
| 2009/0279389 | A1 * | 11/2009 | Irie | G01S 7/003 367/118 |
| 2010/0030838 | A1 * | 2/2010 | Atsmon | A63H 3/28 709/200 |
| 2010/0207820 | A1 * | 8/2010 | Kawano | G01S 11/02 342/393 |
| 2010/0257935 | A1 * | 10/2010 | Suetoshi | A61B 8/0875 73/597 |
| 2011/0013606 | A1 * | 1/2011 | Seok | H04W 8/005 370/338 |
| 2011/0070833 | A1 | 3/2011 | Perkins et al. | |
| 2011/0103614 | A1 * | 5/2011 | Cheung | H04R 1/403 381/94.1 |
| 2011/0225312 | A1 * | 9/2011 | Liu | H04L 12/18 709/231 |
| 2011/0249024 | A1 * | 10/2011 | Arrasvuori | G06F 3/017 345/629 |
| 2011/0319767 | A1 * | 12/2011 | Tsuruno | A61B 8/04 600/459 |
| 2012/0171963 | A1 * | 7/2012 | Tsfaty | H04B 11/00 455/41.3 |
| 2012/0215851 | A1 * | 8/2012 | Wu | H04L 67/104 709/205 |
| 2012/0297306 | A1 * | 11/2012 | Hassan | H04W 76/023 715/735 |
| 2012/0320886 | A1 * | 12/2012 | Anders, Jr. | H04W 76/023 370/338 |
| 2012/0322368 | A1 * | 12/2012 | Desai | H04W 76/023 455/41.1 |
| 2013/0036231 | A1 * | 2/2013 | Suumaki | H04W 12/04 709/228 |
| 2013/0046594 | A1 * | 2/2013 | Davidson | G06Q 30/02 705/14.4 |
| 2013/0106977 | A1 | 5/2013 | Chu et al. | |
| 2013/0132501 | A1 * | 5/2013 | Vandwalle | H04L 67/104 709/208 |
| 2013/0229944 | A1 * | 9/2013 | Montemurro | H04W 8/005 370/254 |
| 2013/0232253 | A1 * | 9/2013 | Elhaddad | H04W 8/005 709/224 |
| 2014/0340366 | A1 * | 11/2014 | Poulsen | G06F 3/0433 345/177 |

FOREIGN PATENT DOCUMENTS

| | | |
|---|---|---|
| CN | 102315864 A | 1/2012 |
| CN | 102378918 A | 3/2012 |
| CN | 103178878 A | 6/2013 |
| CN | 203027256 U | 6/2013 |
| WO | WO-2012042413 A1 | 4/2012 |
| WO | WO-2013074102 A1 | 5/2013 |
| WO | WO-2013108243 A1 | 7/2013 |
| WO | WO-2013109300 A1 | 7/2013 |

OTHER PUBLICATIONS

Schweinzer et al., "Ultrasonic Device Localization and Its Potential for Wireless Sensor Network Security," Control Engineering Practice, vol. 18, Issue 8, Aug. 2010, pp. 852-862, XP27172595, Elsevier B.V.

ISA/EPO, International Search Report and Written Opinion of the International Searching Authority, Int'l App. No. PCT/US2014/063043, Mar. 5, 2015, European Patent Office, Rijswijk, NL 10 pgs.

IPEA/EPO, Second Written Opinion of the International Preliminary Examining Authority, Int'l App. No. PCT/US2014/063043, Sep. 10, 2015, European Patent Office, Munich, DE, 7 pgs.

* cited by examiner

FAST SERVICE DISCOVERY AND PAIRING USING ULTRASONIC COMMUNICATION

BACKGROUND

The following relates generally to wireless communication, and more specifically to point-to-point wireless communication between two or more devices. Wireless communications systems are widely deployed to provide various types of communication content such as voice, video, packet data, messaging, broadcast, and so on. These systems (or networks) may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, point-to-point or point-to-multipoint wireless communication involves two or more devices transmitting and/or receiving signals to and from one another without utilizing an intermediary wireless device. Point-to-point or point-to-multipoint communication may involve initial service discovery and provisioning (e.g., credential authentication) phases. In some cases, an initial discovery phase involves devices alternating between scanning or broadcasting a signal and anticipating a signal transmitted from another device (anticipating a signal is sometimes referred to as "listening" for a signal). This may result in extended connection initiation times because two devices may simultaneously listen for signals, and thus neither device may send a signal. Or, the reverse may be true: two devices may simultaneously be sending signals and neither device is listening. In some cases, a provisioning phase may include a user entering a code or identification, which may also increase connection initiation times and complicate the connection setting process for the average user. Wired discovery and provisioning may be implemented to avoid lengthy initiation times; but relying on wires tends to contravene the benefits of wireless communication.

Alternatively, technologies such as Near-Field Communication (NFC) may be used to indicate availability of a nearby device needed to be connected. But not all equipment to which a user may want to connect utilizes an NFC radio controller. Furthermore, even where NFC controllers do exist, NFC requires close proximity between the two or more peers seeking to connect.

Typical discovery and provisioning procedures may be unsecure because devices may indiscriminately send signals that could be received by both intended and unintended devices. Additionally or alternatively, provisioning information may be inherently unsecure—e.g., credential authentication may include easily decipherable encryption, which may be received by unintended devices. It therefore may be desirable to more expeditiously and securely initiate point-to-point or point-to-multi-point communication.

SUMMARY

The described features generally relate to methods, systems, and apparatuses for service discovery and connection establishment of a point-to-point or point-to-multipoint wireless communication. Wireless devices may initiate point-to-point or point-to-multipoint communication utilizing ultrasonic signals. Using the ultrasonic signals, a user may initiate a scan for one device to detect, select, and establish a connection with another device. For example, scanning may involve sending a modulated packet at ultrasonic frequencies utilizing an ultrasonic signal transmitter, such as an audio speaker or a dedicated ultrasonic transducer. The modulated packet may be received by a second device (e.g., utilizing a microphone or a dedicated ultrasonic transducer), which may identify the first device and respond with an ultrasonic signal. This ultrasonic exchange may allow the two devices to establish a connection and/or pair the devices together, which, in turn, may allow the devices to communicate utilizing a radio-enabled peer-to-peer protocol.

According to at least one set of illustrative embodiments, a method of communicating in a wireless communication network may include: scanning for one or more devices utilizing a first modulated, ultrasonic signal; receiving a second modulated, ultrasonic signal from at least one of the devices in response to the scanning; and selecting one of the devices based at least in part on the received second, modulated ultrasonic signal.

In certain examples, the method may further include determining a position of one of the devices based at least in part on the received second modulated, ultrasonic signal.

In certain examples, selecting one of the devices may be based at least in part on the determined position of the device.

In certain examples, the method may further include establishing a connection with the selected device.

In certain examples, the method may further include communicating with the connected device utilizing a radio-enabled peer-to-peer protocol.

In certain examples, establishing a connection with the selected device may include establishing a radio connection based at least in part on a third modulated, ultrasonic signal.

In certain examples, establishing the radio connection may include exchanging a personal identification number (PIN) code via the third modulated ultrasonic signal.

In certain examples, the method may further include directing a transmitter at one or more devices.

In certain examples, scanning may include transmitting the first modulated, ultrasonic signal via a wideband speaker.

In certain examples, acquiring may include receiving the second modulated, ultrasonic signal via a wideband microphone.

According to at least a second set of illustrative embodiments, a system for communicating in a wireless communication network may include: means for scanning for one or more devices utilizing a first modulated, ultrasonic signal; means for receiving a second modulated, ultrasonic signal from at least one of the devices in response to the scanning; and means for selecting one of the devices based at least in part on the received second, modulated ultrasonic signal.

In certain examples, the system for communicating in the wireless network may implement one or more of the aspects of the method described above with respect to the first set of illustrative embodiments. For example, the system may include means for implementing one or more of the examples of the method described above with respect to the first set of illustrative embodiments.

According to at least a third set of illustrative embodiments, an apparatus for communicating in a wireless communication network may include: a processor; memory in electronic communication with the processor; and instructions stored on the memory. The instructions may be executable by the processor to cause the apparatus to: scan for one or more devices utilizing a first modulated, ultrasonic signal; receive a second modulated, ultrasonic signal from at least one of the devices in response to the scanning; and select one of the devices based at least in part on the received second, modulated ultrasonic signal.

In certain examples, the apparatus for communicating in the wireless network may implement one or more aspects of the method described above with respect to the first set of illustrative embodiments. For example, the memory of the apparatus may include instructions that cause the processor to implement one or more of the examples of the method described above with respect to the first set of illustrative embodiments.

According to at least a fourth set of illustrative embodiments, a computer-program product for communicating in a wireless communication network may include a non-transitory computer readable medium storing instructions executable to cause a processor to: scan for one or more devices utilizing a first modulated, ultrasonic signal; receive a second modulated, ultrasonic signal from at least one of the devices in response to the scanning; and select one of the devices based at least in part on the received second, modulated ultrasonic signal.

In certain examples, the computer-program product may implement one or more aspects of the method described above with respect to the first set of illustrative embodiments. For example, the computer readable medium may include instructions executable to cause the processor to implement one or more of the examples of the method described above with respect to the first set of illustrative embodiments.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
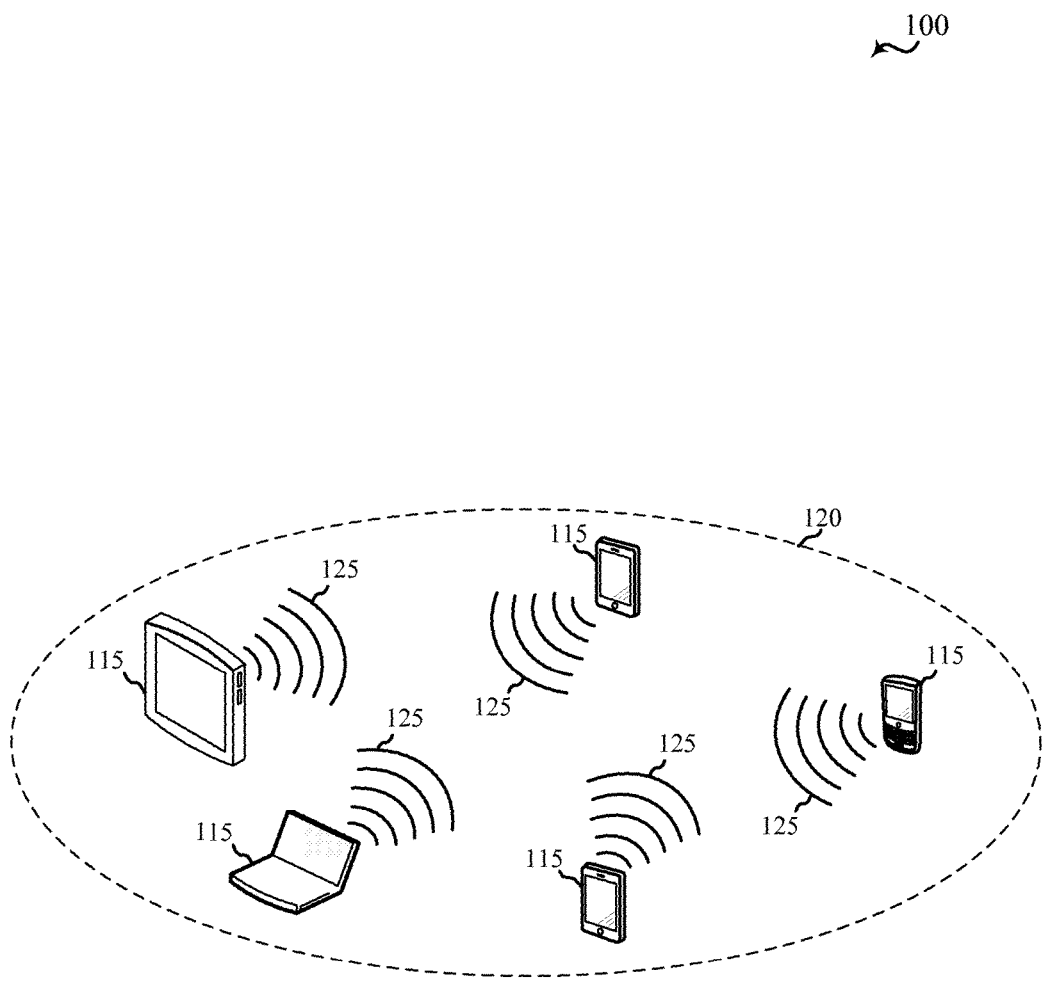
FIGS. 1A and 1B depict a wireless communication system or systems in accordance with various embodiments.

The described features generally relate to methods, systems, and apparatuses for point-to-point and/or point-to-multipoint wireless communication. Wireless devices may initiate point-to-point and/or point-to-multipoint communication utilizing ultrasonic signals. A user may initiate a scan for one device to detect, select, and establish a connection with another device. For example, scanning may involve sending a modulated packet at ultrasonic frequencies utilizing an audio speaker or ultrasonic transducer on the device. The modulated packet may be received by a second device (e.g., utilizing a microphone or ultrasonic transducer), which may identify the first device and respond with an ultrasonic signal. This ultrasonic exchange may allow the two devices to discover one another and establish a connection, which, in turn, may allow the devices to communicate utilizing a radio-enabled peer-to-peer protocol. For example, the two devices may discover one another and establish a connection and then communicate directly with each other utilizing wireless local access network (WLAN) and/or wireless personal area network (WPAN) radio technology, such as technology based on the IEEE 802.11 family of standards (Wi-Fi), Bluetooth, the IEEE 802.15 family of standards (ZigBee), and the like.

Ultrasonic point-to-point and/or point-multipoint communication initiation may be beneficial in that it may be accomplished quickly and devices are often pre-equipped with necessary hardware. Devices may be configured to anticipate when to listen for and when to transmit signals. Further, ultrasonic signals tend not to penetrate walls, so transmitted information may be less vulnerable to unwanted reception. Additionally, ultrasonic signals may be directed to a specific target, decreasing a likelihood of unwanted signal interception. Ultrasonic signals may also be used to calculate a position (e.g., range and azimuth) such that a user can select only the device located in a certain range of positions or in a position as indicated by the range and azimuth.

Devices employing the described point-to-point and/or point-to-multipoint communication methods may be equipped with ultrasonic transmission-and-reception-capable devices or equipment, such as a wideband speaker and wideband microphone. Wideband, as used herein, means a device capable of transmitting and/or receiving both sound and ultrasonic frequency bands. One device may be a smartphone and a second device may be a smart-television (smartTV)—e.g., a TV equipped with ultrasonic speakers and microphone(s) and various wireless communication means. A user wishing to establish a connection between and/or pair the two devices—e.g., enable the devices to communicate with one another using point-to-point wireless communication—may initiate a scan with the smartphone. The smartphone may transmit a modulated, ultrasonic signal (e.g., a modulated packet) via a speaker on the smartphone. The smartTV may receive the scanning signal, ascertain the identity of the smartphone and send a modulated, ultrasonic signal in response. The response signal may include the identity of the smartTV, information about the services the smartTV can provide, and information about a method for point-to-point and/or point-to-multipoint communication.

For example, the response may indicate which Wi-Fi channel the smartphone should use to communicate with the smartTV; and the response may include information about which device, of the two, may act as the Wi-Fi "access point" or "group owner." The smartphone may receive the response, identify the smartTV, select and establish a connection with the smartTV, and send an acknowledgement reply, which may be another modulated, ultrasonic signal. The smartphone may then begin Wi-Fi communication with the smartTV to complete the connection establishment and/or pairing process, which may include authentication, association, and a key exchange. For example, the smartphone may stream video to the smartTV via a Wi-Fi channel.

In some embodiments, one or more devices share personal identification numbers (PIN), which may be unique device identifiers and/or codes set by a user, during ultrasonic point-to-point communication initiation. The PINs may be used to authenticate devices. In some cases, a device may create profiles of authenticated devices, which may allow the devices to communicate via Wi-Fi without the necessity of a subsequent initiation sequence. Additionally or alternatively, point-to-point communication may be securely initiated via directed scan transmission from one device toward another, such that a user may increase a likelihood of initiating contact with a desired device.

The various techniques described herein for employing point-to-point communications employing ultrasonic signals are described with respect to WLAN or Wi-Fi networks. A WLAN or Wi-Fi network may refer to a network that is based on the protocols described in the various IEEE 802.11 standards (e.g., IEEE 802.11a/g, 802.11n, 802.11ac, 802.11ad, etc.), or Wi-Fi Alliance standards, such as "Wi-Fi Direct" and "Wi-Fi Protected Setup" (WPS) or "Wi-Fi Simple Config." (WSC), for example. However, the same or similar techniques may also be used in various wireless networks. For example, the same or similar techniques may be used for various wireless communications systems such as WPANs, cellular wireless systems, Peer-to-Peer and/or point-to-multipoint wireless communications, ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), Wi-Fi, IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1A, a wireless communication system 100 is depicted in accordance with various embodiments. The system 100 includes devices 115 in an area 120. The devices 115 may be referred to as user equipment or UE 115. The devices 115 may be computers, cellular phones, smartphones, tablets, laptop computers, notebook computers, netbook computers, PDAs, smartTVs, or other similar electronic devices. A device 115 may have audio components that allows it to support voice conversations, music playback, and/or recording, for instance. The devices 115 may broadcast or otherwise transmit ultrasonic signals 125. In some embodiments, the devices 115 scan for one or more other devices 115 with a modulated ultrasonic signal 125. The devices 115 may receive an ultrasonic signal 125 and broadcast an ultrasonic signal 125 in response. For example, a smartphone 115 may scan for a smartTV 115, where the scanning includes broadcasting a modulated, ultrasonic signal 125. The smartTV 115 may receive the modulated, ultrasonic signal 125 from the smartphone 115, and the smartTV 115 may transmit a responsive modulated, ultrasonic signal 125, which the smartphone 115 may receive. In some cases, the smartphone 115 selects the smartTV 115 for connection establishment. The smartphone 115 may determine a position (e.g., distance and angle) of the smartTV 115 based on the responsive ultrasonic signal 125. The smartphone 115 may, for example, select the smartTV 115 based on the determined position of the smartTV 115.

In some embodiments, the devices 115 utilize wideband speakers and microphones to broadcast and receive, respectively, ultrasonic signals 125. For example, a smartphone 115 may employ a typical ear-piece or speaker and a typical microphone to transmit and receive ultrasonic signals 125. In some embodiments, a smartTV 115 is equipped with both a wideband speaker and a wideband microphone. Likewise, a computer, for example a notebook or tablet, includes a wideband speaker and a microphone, which may be employed.

The ultrasonic signals 125 may be in a frequency range above 20 kHz, for example. The devices 115 may employ a sampling frequency of at least twice the highest broadcast frequency.

A device 115 with at least one wideband speaker and one wideband microphone may determine a position of a second device 115. The determined position of the second device 115 may include a distance or an angle, or both. For example, a first device 115 may determine a round trip delay between transmitting and receiving an ultrasonic signal 125. The round trip delay can allow for a calculation of a distance between devices. For instance, the first device 115 may transmit a signal, and a second device 115 may receive the signal and send a response within a pre-determined delay. In such cases, the time of round-trip signaling minus the pre-determined delay is proportional to distance. For example, $d = c \times t$, where d is a distance between devices 115, c is the speed of sound, and t is the time of the round-trip signaling minus the pre-determined delay.

In some embodiments, a device 115 equipped with at least two microphones and at least one speaker may determine both a distance and a direction of a second device 115. For example, the first device 115 may calculate a time-difference of arrival between two received signals to determine an angle, which may be used to determine a distance of the second device 115. In still other embodiments, a device 115 equipped with at least three microphones and one speaker may determine a location of a second device 115. For example, the first device 115 may utilize time-difference of arrival and triangulation and/or trilateration of three received signals to determine a location of a second device 115. In some cases, a distance and angle of a second device 115 can be calculated by combining the trilateration and/or round trip measurements.

Figure 1B:
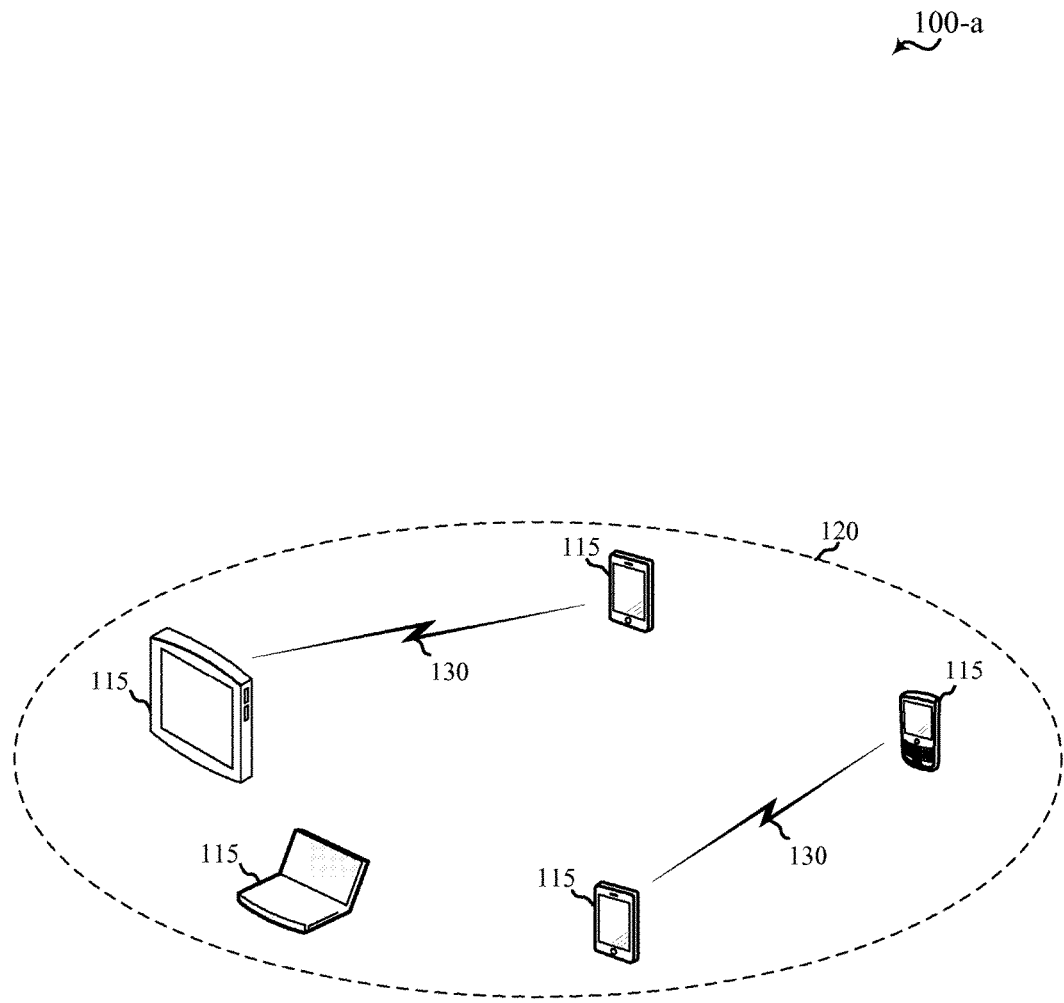

Next, FIG. 1B depicts a system 100-a of devices 115 in an area 120. The devices 115 may be examples of the devices 115 described with reference to FIG. 1A. In some cases, two devices 115 have established a connection and/or paired with one another. Such connected (or paired) devices may communicate via communication links 130. The communication links 130 may be, for example, transmissions and receptions of wireless signals between WLAN or WPAN radios. For example, two connected devices 115 may communicate 130 according to Wi-Fi standards (e.g., utilizing Wi-Fi Direct). In other embodiments, connected devices 115 communicate 130 with LTE-Direct signals. In still other cases, devices 115 communicate 130 utilizing Bluetooth. In the various embodiments, the devices 115 are capable of communicating 130 with one another via ultrasonic signals 125 (see FIG. 1A) and communication links 130 (e.g., Wi-Fi Direct, WSC, Bluetooth, Zigbee, etc.).

One device 115 may establish a radio connection with another device 115. In some embodiments, the devices 115 utilize a modulated signal 125 to establish a radio connection. In some cases, the devices 115 utilize other wireless communications, such as communication links 130 to create profiles. Establishing a radio link may include exchanging personal identification number (PIN) codes between devices 115. Such PINS may be used by one device 115, such as a smartTV, to recognize another device 115, such as a smartphone, for subsequent communication (e.g., pairing) sessions. For example, a smartphone may establish a profile with a smartTV, and the profile may include certain information about the smartphone (e.g., a PIN), which may enable the two devices 115 to quickly establish a connection and communicate without a lengthy initial exchange of identifying information.

In some instances, a user of a first device 115 may intend to connect with a specific second device 115. By way of example, two friends, who each have smartphones, may intend to connect their respective devices 115 to exchange photos. The user of the first smartphone may direct the transmitter of her phone (e.g., the speaker) in the direction of the second smartphone. In this way, the user of the first device more accurately controls a scanning ultrasonic signal 125 broadcast from the first device. In some cases, devices 115 may automatically direct transmitters for scanning purposes. For example, a smartTV may have multiple speakers and the smartTV may select a particular speaker or set of speakers for scanning. Thus, speakers may be selected for the purpose of directing a scanning ultrasonic signal 125 in the direction of a particular device 115.

Figure 2A:
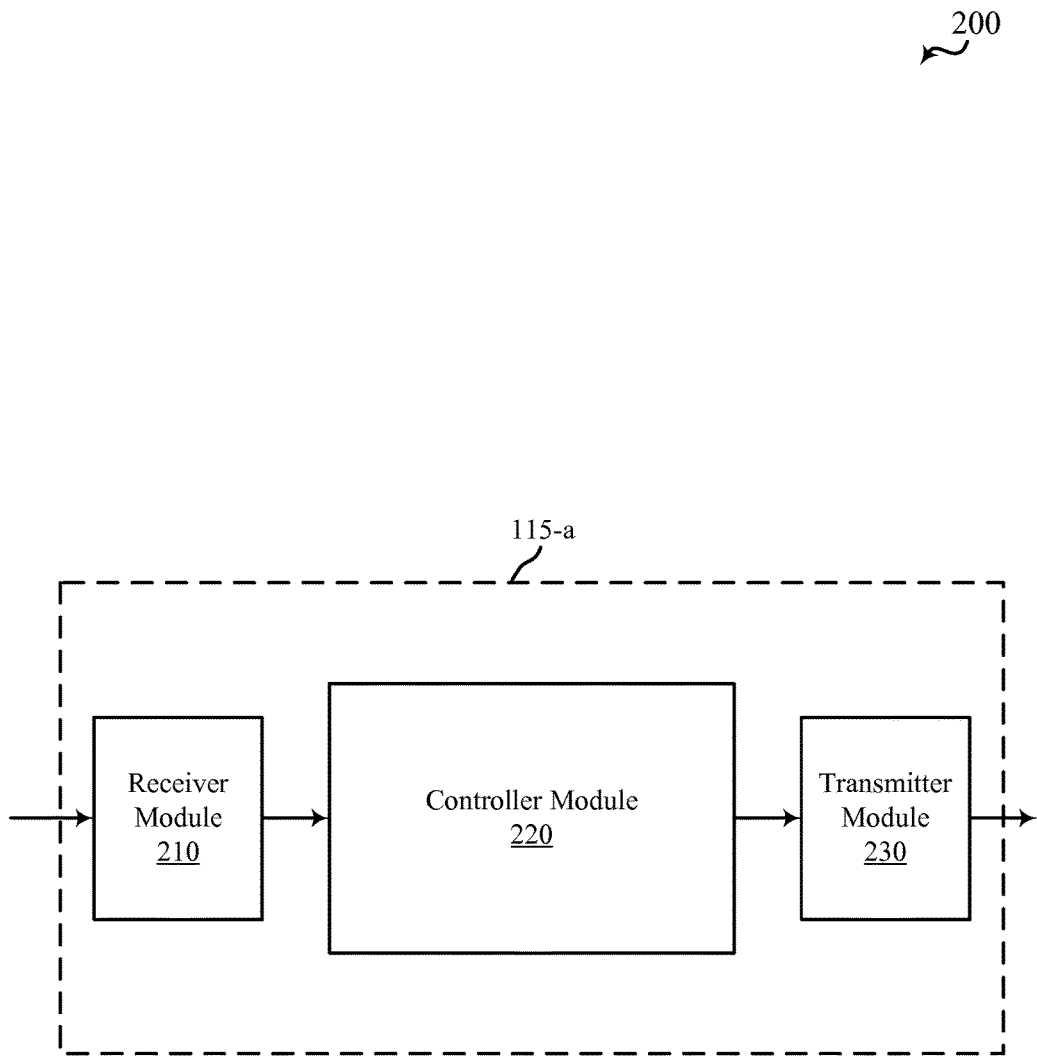
FIGS. 2A, 2B, and 2C are block diagrams depicting a device or devices configured for wireless communication in accordance with various embodiments.

Turning next to FIG. 2A, a block diagram 200 depicts a device 115-a configured for wireless communication in accordance with various embodiments. The device 115-a may be an example of, or include aspects of, the devices 115 described with reference to FIGS. 1A and 1B. The device 115-a may be, for example, means for performing the functions described with reference to the devices 115. The device 115-a may include a receiver module 210, a controller module 220, and/or a transmitter module 230. Each of the devices may be in communication with one another. In some cases, one or more of the modules is a processor. The controller module 220 may generate a scanning signal, which may be conveyed to the transmitter module 230 and broadcast as an ultrasonic signal to scan for other devices 115. The receiver module 210 may receive an ultrasonic signal from another device 115. In some cases, the controller module 220 selects a device 115 for connection establishment based on a signal received by the receiver module 210.

In some embodiments, the receiver module 210, the controller module 220, and the transmitter module 230 are aspects of a WLAN radio. Thus, the various modules may receive, process, and transmit various data packets according to, for example, the Wi-Fi standard.

The components of the device 115-a may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

Figure 2B:
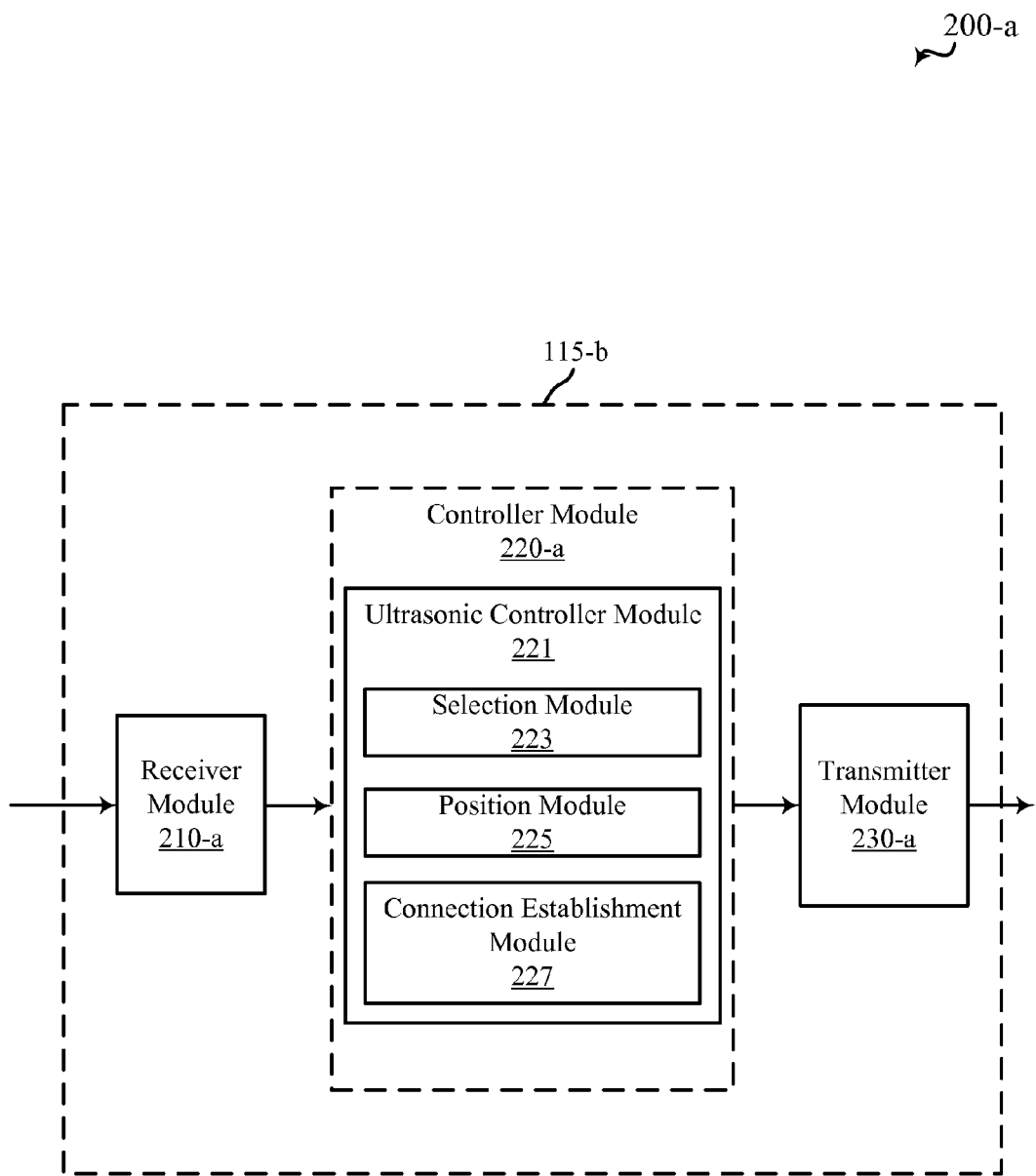

Next, in FIG. 2B, a block diagram 200-a depicts a device 115-b configured for wireless communication in accordance with various embodiments. The device 115-b may be an example of, or include aspects of, the devices 115 described with reference to FIGS. 1A, 1B, and 2A. The device 115-b may include, for example, means for performing the functions described with reference to the devices 115. The device 115-b may include a receiver module 210-a, a controller module 220-a, and/or a transmitter module 230-a. These modules may perform substantially the same functions as the corresponding modules of FIG. 2A. In some cases, the controller module 220-a includes an ultrasonic controller module 221. The ultrasonic controller module 221 may include a selection module 223, a position module 225, and/or a connection establishment module 227. Each of the devices may be in communication with one another. In some embodiments, one or more of the modules is a processor.

The selection module 223 may select a device 115 for establishing a connection and/or pairing with the device 115-b. The position module 225 may determine a position of a device 115; and the determined position may be the basis for establishing a connection with the device 115-b. The position module 225 may determine the position of device 115 using one or more of the various methods described herein. For example, the position module 225 may calculate the round trip delay between an ultrasonic signal broadcast from the transmitter module 230-*a* and a subsequent ultrasonic signal received by the receiver module 210-*a*. Additionally or alternatively, the position module 225 may utilize time-difference of arrival and triangulation and/or trilateration of several received signals to determine a location of a second device 115. In some cases, a distance and angle of a second device 115 can be calculated by combining the trilateration and/or round trip measurements.

Once a position of a device 115 has been determined, and that device has been selected, the connection establishment module 227 may control connection establishment and/or pairing with the device 115-*b*. For example, the connection establishment module 227 may facilitate transmitting and/or receiving a PIN (or other profile information) via the transmitter module 230-*a*.

The components of the device 115-*b* may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

Figure 2C:
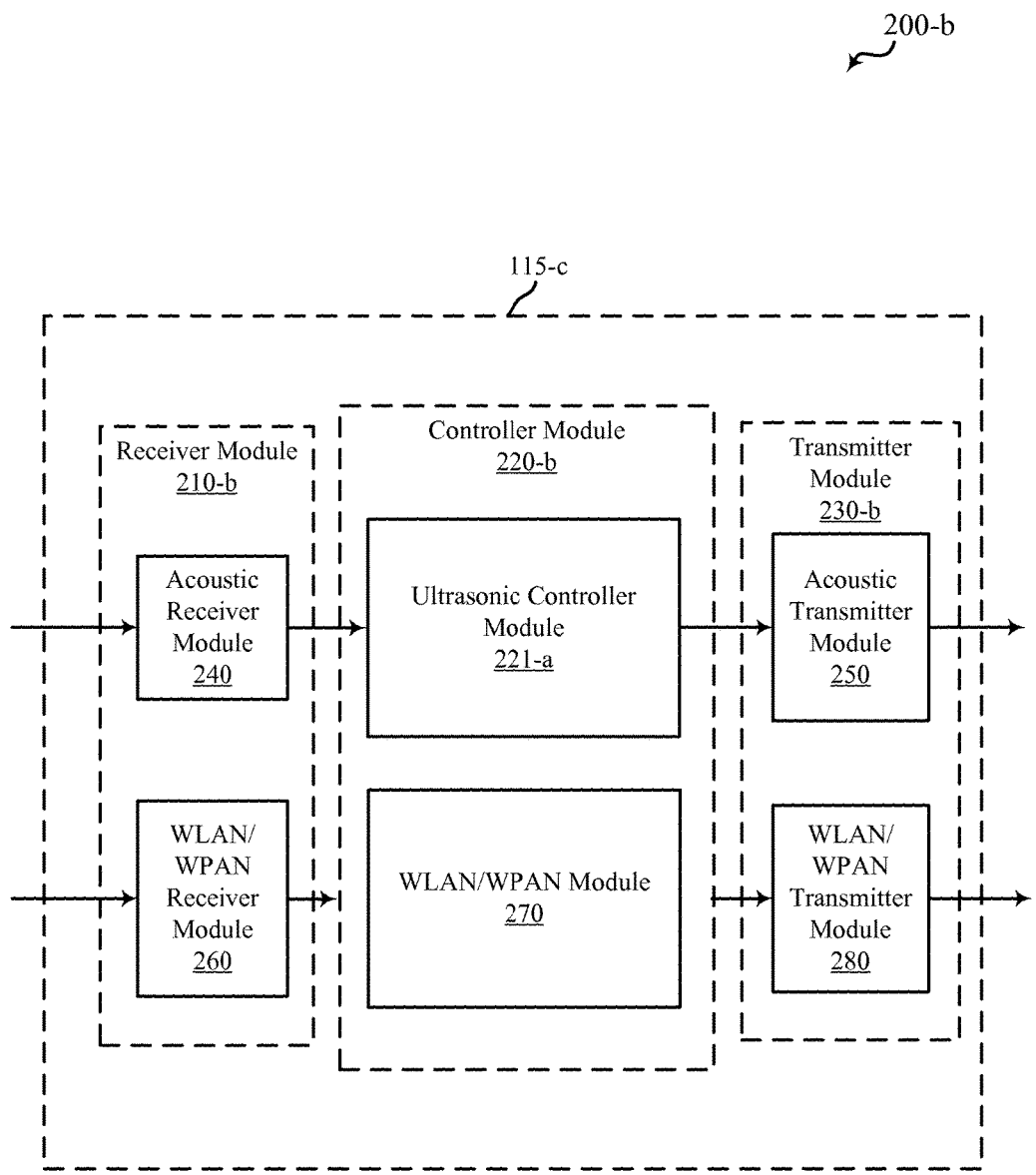

Next, FIG. 2C is a block diagram 200-*b* depicting a device 115-*c* configured for wireless communications in accordance with various embodiments. The device 115-*c* may be an example of, or include aspects of, the devices 115 described with reference to FIGS. 1A, 1B, 2A, and 2B. The device 115-*c* may include, for example, means for performing the functions described with reference to the devices 115. The device 115-*b* may include a receiver module 210-*b*, a controller module 220-*b*, and/or a transmitter module 230-*b*. These modules may perform substantially the same functions as the corresponding modules of FIGS. 2A and 2B. In some embodiments, the receiver module 210-*b* includes an acoustic receiver module 240 (e.g., a device capable of ultrasonic and/or wideband reception) and/or a WLAN/WPAN receiver module 260. In some cases, the controller module 220-*b* includes an ultrasonic controller module 221-*a*, which may be an example of the ultrasonic controller module 221 of FIG. 2A. Additionally or alternatively, the controller module 220-*b* includes a WLAN/WPAN module 270. And the transmitter module 230-*b* may include an acoustic transmitter module 250 (e.g., a device capable of ultrasonic and/or wideband transmissions) and/or a WLAN/WPAN transmitter module 280. Each of the modules may be in communication with one another. In some cases, one or more of the modules is a processor.

The various modules may or may not be physically grouped as depicted. For example, the acoustic receiver module 240 and the WLAN/WPAN receiver module 260 may or may not be aspects of a common, physical receiver module 210-*b*. Likewise, the submodules of the controller module 220-*b* and the transmitter module 230-*b* may or may not be aspects of common, physical modules. In some embodiments, the receiver module 210-*b*, controller module 220-*b*, and/or transmitter module 230-*b* depict logical (if not physical) relationships between dual technologies of the device 115-*c*.

The acoustic transmitter module 250 may broadcast (e.g., for purposes of scanning) a modulated, ultrasonic signal. In some cases, the acoustic transmitter module 250 includes one or more wideband speakers; in other cases, it includes one or more ultrasonic transducers. The acoustic receiver module 240 may receive modulated, ultrasonic signals from one or more devices 115 in response to the broadcast signal. In some embodiments, the acoustic receiver module 240 includes one or more wideband microphones. In embodiments employing more than one microphone, each microphone may be physically located apart from one another—for example, on opposites sides of the device 115-*c*. The ultrasonic controller module 221-*a* may select a device based on the received ultrasonic signal. The ultrasonic controller module 221-*a* may include, and utilize, functionality of the various submodules (e.g., the selection module 223, the position module 225, and/or the connection establishment module 227) described with reference to FIG. 2B.

In some embodiments, the WLAN/WPAN transmitter module 280 transmits Wi-Fi and/or Bluetooth packets for communication with a connected device 115. The WLAN/WPAN receiver module 260 may receive packets from connected devices. The WLAN/WPAN module 270 may control WLAN/WPAN communications for the device 115-*c*. For example, the WLAN/WPAN module 270 may control the channel that the device 115-*c* utilizes for communication with another device 115. In some cases, the ultrasonic controller module 221-*a* receives, during an ultrasonic discovery process, a directive from a device 115 regarding which Wi-Fi channel to use. The ultrasonic controller module 221-*a* may communicate such information to the WLAN/WPAN module 270, which, in turn, may utilize that channel.

The components of the device 115-*b* may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

Figure 3:
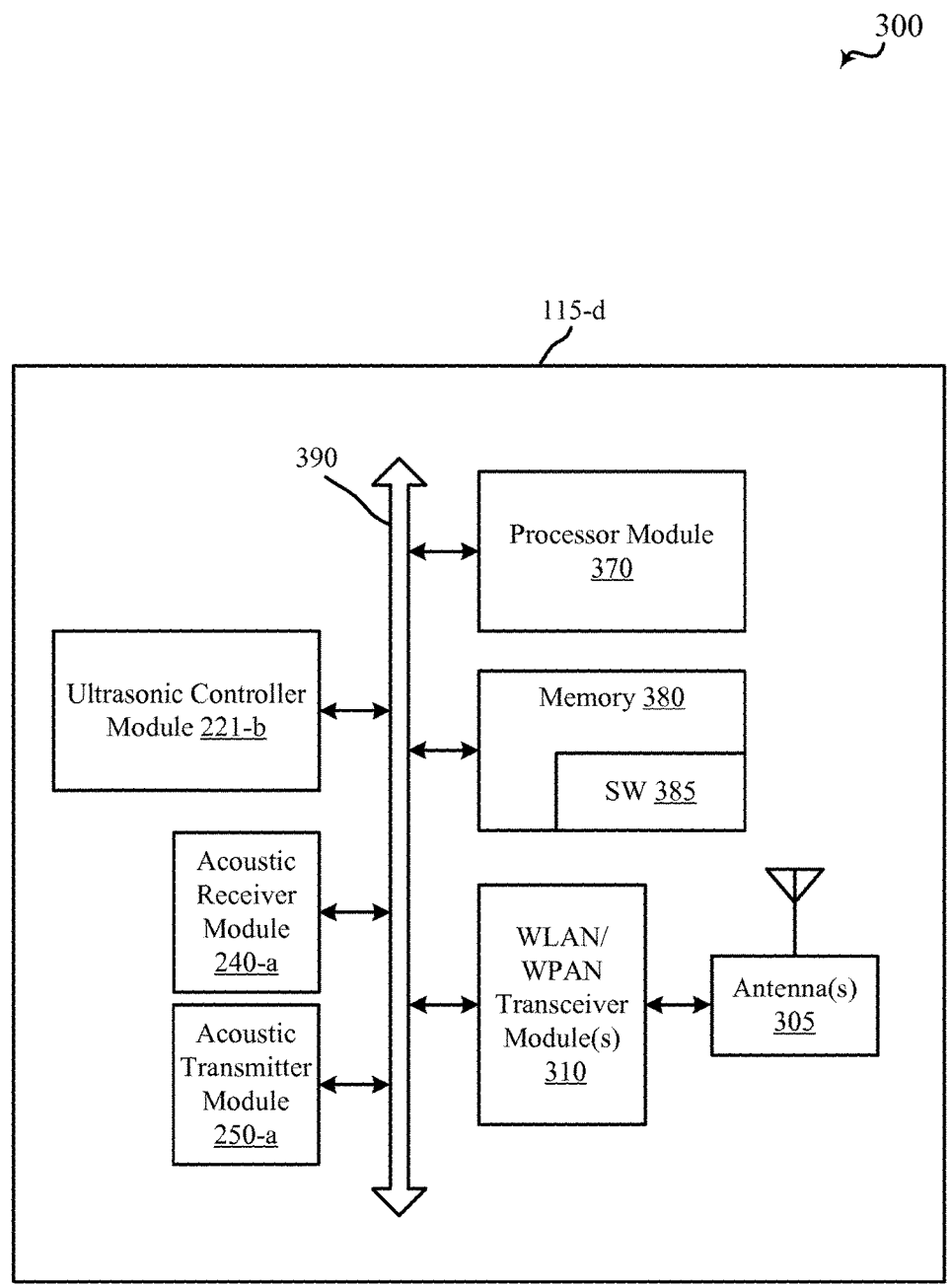
FIG. 3 is a block diagram of a device configured for wireless communication according to various embodiments.

Turning now to FIG. 3, which depicts a block diagram 300 of a device 115-*d* configured for wireless communication according to various embodiments. The device 115-*d* may be an example of the devices 115 described with reference to FIGS. 1A and 1B. In some embodiments, the device 115-*d* includes aspects of the devices 115-*a*, 115-*b*, and/or 115-*c* described with reference to FIGS. 2A, 2B, and 2C. For example, the device 115-*d* includes means for discovering, selecting, and/or connecting with another device 115 via ultrasonic signals. The device 115-*d* may include an ultrasonic controller module 221-*b*, an acoustic receiver module 240-*a*, and an acoustic transmitter module 250-*a*. The device 115-*d* may also include antenna(s) 305, a WLAN/WPAN transceiver module 310, a processor module 370, memory 380, and software (SW) 385. Each of the various modules of the device 115-*d* may be in communication with one another, for example, via the bus or buses 390.

The ultrasonic controller module 221-*b* may perform substantially the same functions, and it may include similar submodules as the ultrasonic controller modules 221 described with reference to FIGS. 2B and 2C. Additionally or alternatively, the ultrasonic controller module 221-*b* may generate modulated signals, which may be transmitted as modulated ultrasonic signals via the acoustic transmitter module 250-*a*. The acoustic receiver module 240-*a* may receive modulated ultrasonic signals, which may be demodulated via the ultrasonic controller module 221-*b*.

The WLAN/WPAN transceiver module(s) 310 may include a modem(s) configured to modulate packets of data and provide the modulated packets to the antenna(s) 305 for transmission, and to demodulate packets received from the antenna(s) 305. For example, the transceiver module(s) 310 may modulate or demodulate packets transmitted to and received from other devices 115 via WLAN/WPAN connections. The WLAN/WPAN transceiver module(s) 310 may be implemented as one or more transmitter modules and one or more separate receiver modules. The WLAN/WPAN transceiver module(s) 310 may be configured for transmission/reception at different Wi-Fi and/or Bluetooth bands and/or subbands. The WLAN/WPAN transceiver module(s) 310 may be configured to communicate bi-directionally, via the antennas 305. The WLAN/WPAN transceiver module(s) 310 may be or include Wi-Fi, Bluetooth, and/or Zigbee radios.

The memory 380 may include random access memory (RAM) or read-only memory (ROM), or both. The memory 380 may store computer-readable, computer-executable software/firmware code 385 containing instructions that are configured to, when executed, cause the processor module 370 to perform various functions described herein (e.g., scanning for, locating, and connecting with devices 115 utilizing ultrasonic signals). Alternatively, the software/firmware code 385 may not be directly executable by the processor module 370 but may be configured to cause a computer (e.g., when compiled and executed) to perform functions described herein. The processor module 370 may include an intelligent hardware device, e.g., a central processing unit (CPU), a microcontroller, an application-specific integrated circuit (ASIC), etc.

According to some embodiments, the acoustic transmitter module 250-*a* includes a wideband speaker, which is adjustable, and which may be directed at devices 115. The processor module 370 may be configured to direct (e.g., aim) the acoustic transmitter module 250-*a*.

Figure 4A:
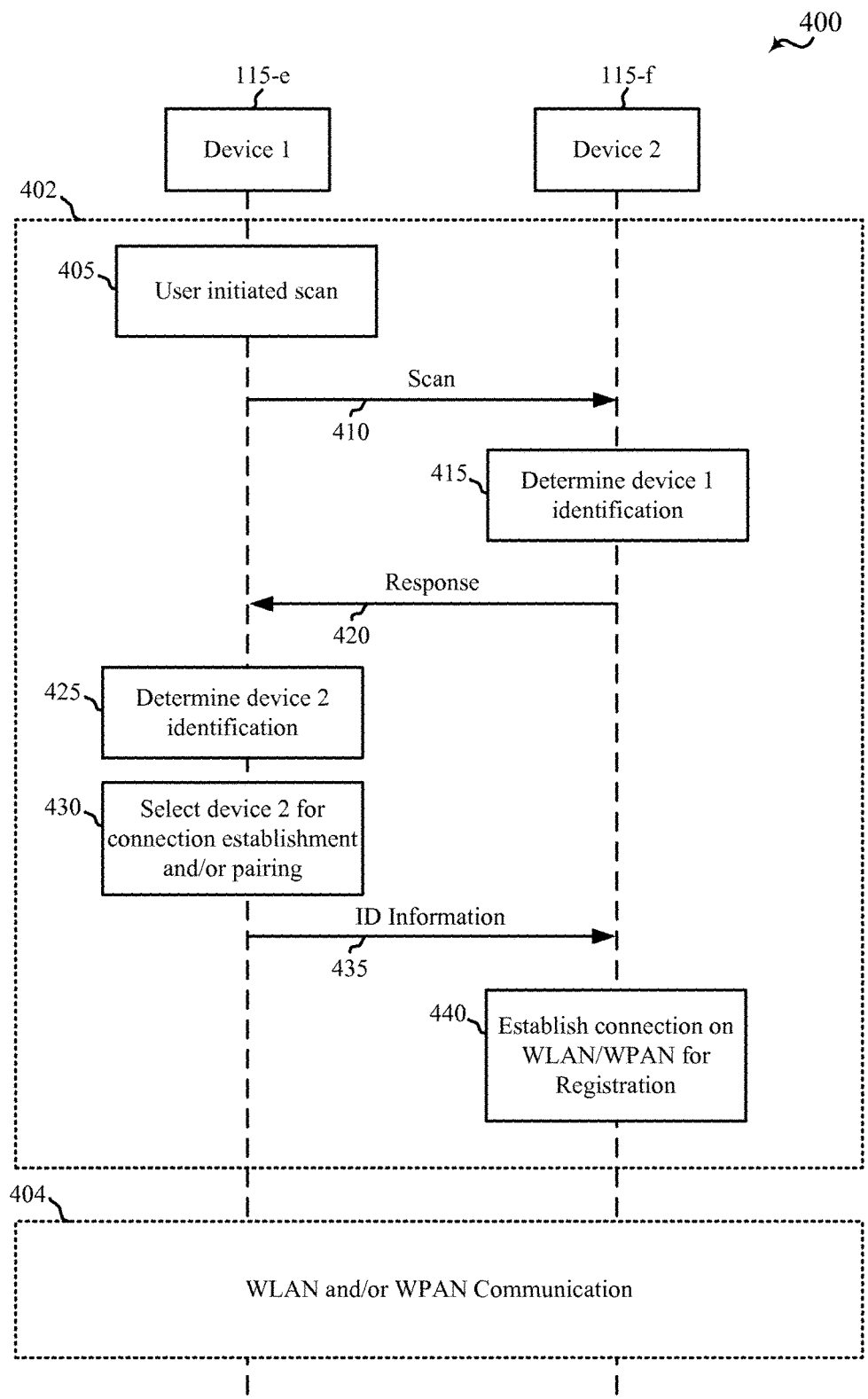
FIGS. 4A and 4B are call flow diagrams illustrating wireless communication between devices according to various embodiments.

Next, FIG. 4A depicts a call flow diagram 400, which illustrates communication between devices 115 according to various embodiments. The devices 115-*e* and 115-*f* may be examples of the devices 115 described with reference to the preceding Figures. The devices 115 may communicate with one another using an ultrasonic communication stage 402 and a WLAN/WPAN communication stage 404. In some cases, the ultrasonic communication stage may be referred to as a discovery stage, an ultrasonic discovery stage, a discovery and registration stage, or a discovery and connection establishment (or pairing) stage. For example, all of the signals between devices 115 during the ultrasonic communication 402 stage may be ultrasonic signals; while all of the signals between devices 115 during the WLAN/WPAN communication stage 404 may be signals utilizing a radio-enabled peer-to-peer protocol, such as Wi-Fi or Bluetooth.

In some cases, the first device 115-*e* initiates a scanning sequence. This may be a user initiated scan 405. The device 115-*e* may scan for other devices 115, which may include broadcasting an ultrasonic scanning signal 410. In some embodiments, the ultrasonic scanning signal 410 is a modulated ultrasonic signal. The ultrasonic signal 410 may include indentifying information about the first device 115-*e*. In some cases, the ultrasonic signal 410 indicates a reason why the first device 115-*e* seeks to connect with the second device 115-*f*.

A second device 115-*f* may receive the ultrasonic signal 410, which it may use to determine the first device's 115-*e* identification 415. The second device 115-*f* may transmit a responsive ultrasonic signal 420. The ultrasonic signal 420 may be a modulated ultrasonic signal. It may also include identifying information about the second device 115-*f*. In some cases, the ultrasonic signal 420 indicates a WLAN or WPAN channel the first device 115-*g* should use to communicate with the second device 115-*f*. The first device 115-*e* may receive the ultrasonic signal 420, which it may use to determine the second device's 115-*f* identification 425.

In some embodiments, the first device 115-*e* then selects the second device 115-*f* for connection establishment and/or pairing 430. After which, the first device 115-*e* may transmit an ultrasonic ID information signal 435, which may be a modulated ultrasonic signal. The ultrasonic signal 435 may include additional identifying information about the first device 115-*e*. For instance, the ultrasonic signal 435 may include profile information that the second device 115-*f* may use to establish a radio connection for the first device 115-*e*. Additionally or alternatively, the ultrasonic signal 435 may include information about the WLAN or WPAN channel the first device 115-*e* intends to use for communication with the second device 115-*f*.

The second device 115-*f* may utilize the ultrasonic signal 435 to establish a connection 440 on WLAN or WPAN for registration and association of the first device 115-*e*. In some embodiments, the ultrasonic signal 435 includes a PIN for the first device 115-*g*. Alternatively, the devices 115 may exchange other types of codes or password(s) indicative of identity. In some embodiments, establishing a connection 440 WLAN/WPAN for registration and storing data in a profile is referred to as pairing.

Figure 4B:
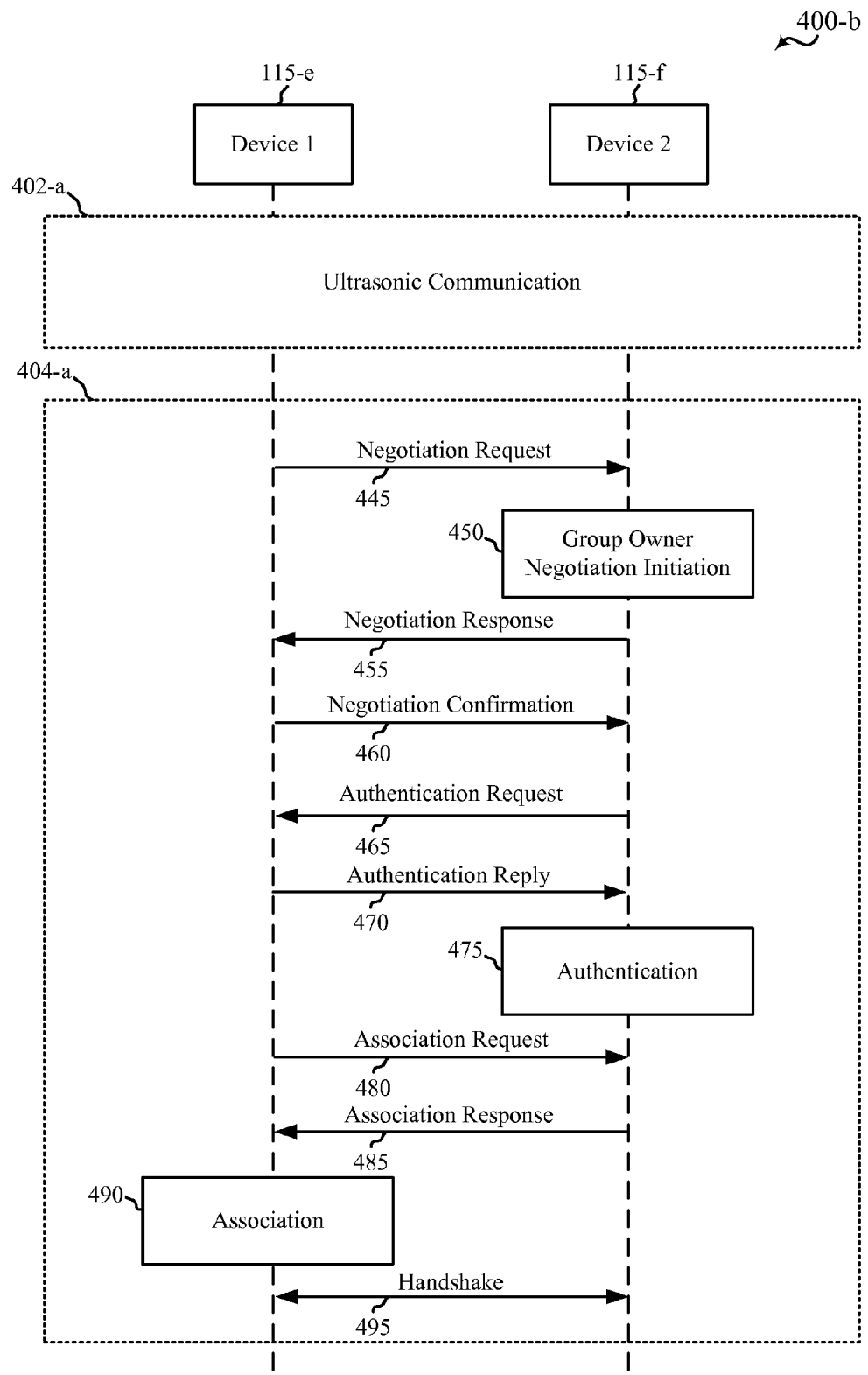

FIG. 4B depicts a call flow diagram 400-*a*, which illustrates communication between devices 115 according to various embodiments. The devices 115-*e* and 115-*f* may be examples of the devices 115 described with reference to the preceding Figures. For example, the device 115-*e* and 115-*f* may be the devices described with reference to FIG. 4A. The devices 115 may communicate with one another using an ultrasonic communication stage 402-*a* and a WLAN/WPAN communication stage 404-*a*. In some embodiments, the communication stages 402-*a* and 404-*a* are examples, or illustrate aspects of the stages 402 and 404 described with reference to FIG. 4A. For instance, each of the signals between the devices in the WLAN/WPAN communication stage 404-*a* may be WLAN/WPAN signals, such as Wi-Fi or Bluetooth signals.

In some embodiments, a connection establishment process occurs, or includes additional steps, during the WLAN/WPAN connection stage 404-*a*, while in additional embodiments, connection establishment with the above steps may also include storage of the connection data in a profile (e.g., pairing). Connection establishment and/or profile establishment or creation may thus occur using WLAN or WPAN signaling. For example, connection establishment and profile establishment may involve WSC, Wi-Fi Direct, and/or Bluetooth pairing techniques, which may include "built-in" or external registration processes. Registration for these radio-enabled peer-to-peer protocols may include association and/or authentication specific to the particular protocol. In such cases, ultrasonic communication, as described with reference to FIG. 4A, may be employed to limit the complicated scanning issues typically associated with device identification and to provide the PIN code needed for the connection establishment and/or pairing process.

By way of example, once the device 115-*e* has established a WLAN or WPAN connection with the device 115-*f*, the device 115-*e* may transmit a negotiation request 445, which may be a request to be begin group owner negotiation. The devices 115 may thus negotiate which device among them will act as an access point. The device 115-*f* may initiate group owner negotiation 450, and it may transmit a negotiation response 455. For example, the device 115-*f* may indicate its intent to act as group owner. The device 115-*e* may then transmit a negotiation confirmation 460 to complete the group owner negotiation process.

The device 115-*f* may transmit an authentication request 465 according to the particular radio-enabled peer-to-peer protocol with which the devices 115 will communicate. The device 115-*e* may transmit an authentication reply 470, which may include the ID information (e.g., PIN code) exchanged during the ultrasonic stage 402-*a*. Then, in some cases, the device 115-*f* utilizes the authentication reply 470 and the earlier exchanged ID information for authentication 475 of the device 115-*e*.

Next, the device 115-*e* may transmit an association request 480; and the device 115-*f* may transmit an association response 485. The association response 485 may include ID information, such as the PIN code. The ID information may be used for association 490 according to the particular radio-enabled peer-to-peer protocol with which the devices 115 will communicate. A connection establishment process, which may be followed by a profile storage process, between devices 115-*e* and 115-*f* may thus include a registration process, which, in turn, includes authentication and association. Alternatively, registration (e.g., authentication and association) may be independent of pairing. In such cases, pairing may include establishing a WLAN/WPAN connection for purposes of registration.

After registration (e.g., authentication and association), the devices 115 may engage in a handshake 495 to establish credentials according to the particular radio-enabled peer-to-peer protocol with which the devices 115 will communicate. For example, the handshake 495 may involve sharing a secret key or pass code, which may be done utilizing earlier exchanged ID information, such as the PIN code. In some embodiments, once both devices 115 have the secret key (e.g., after a handshake 495), WLAN/WPAN communication between devices 115 may then commence. Additionally or alternatively, one or both devices 115 may create a profile for the other device 115.

Figure 5:
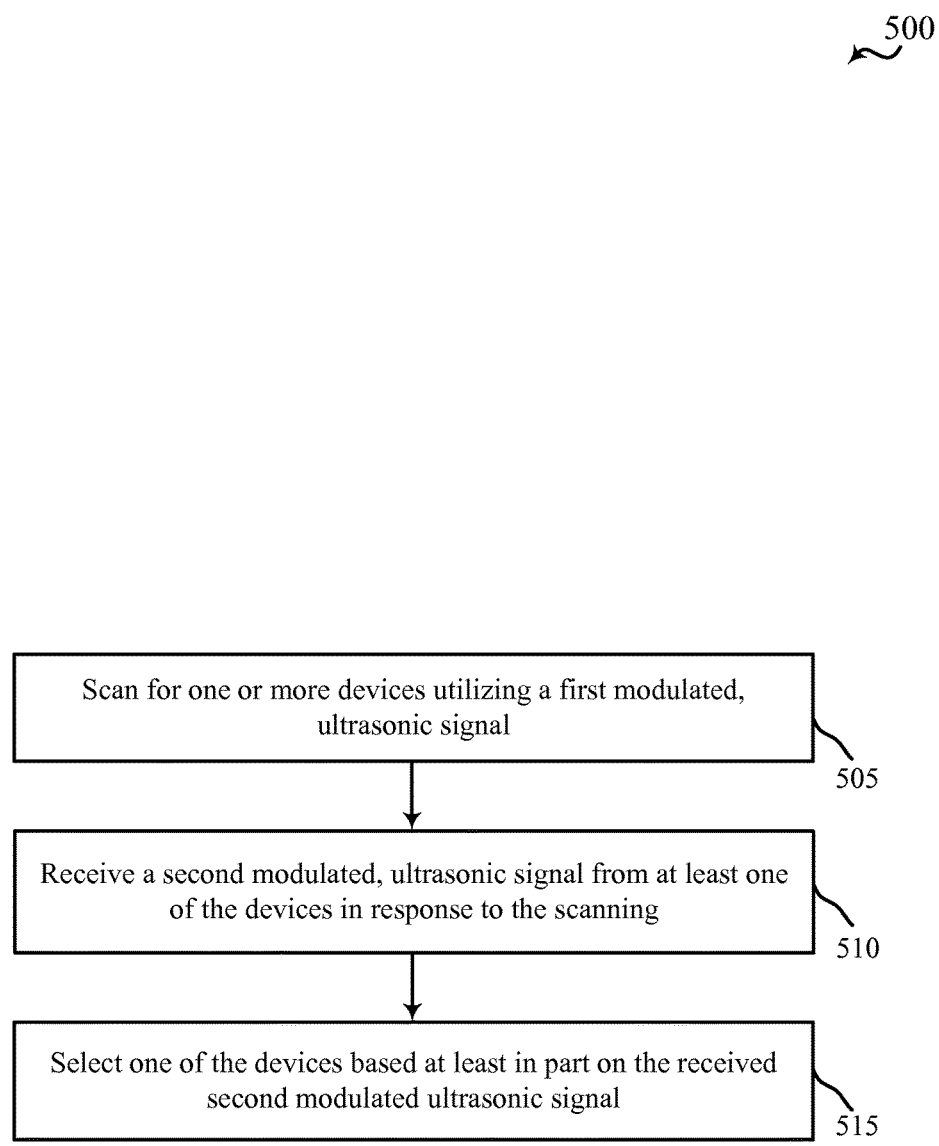
FIG. 5 is a flow diagram illustrating a method for communicating in a wireless network according to various embodiments.

Turning now to FIG. 5, which is a flow diagram 500 of a method for communicating in a wireless network according to various embodiments. The method may be implemented by one or more devices 115 described with reference to FIGS. 1A, 1B, 2A, 2B, 2C, 3, and 4.

At block 505, a first device may scan for one or more other devices utilizing a first modulated, ultrasonic signal. Scanning may include transmitting or broadcasting a signal from a wideband speaker or an ultrasonic transducer. The operations of block 505 are, in some cases, performed by the transmitter modules 230 of FIG. 2A or 2B, or the acoustic transmitter modules 260 of FIG. 2C or 3.

At block 510, the device may receive a second modulated, ultrasonic signal from at least one the other devices in response to the scanning. Receiving may include receiving a signal via a wideband microphone or an ultrasonic transducer. The operations of block 510 may be performed, for example, by the receiver modules 210 of FIGS. 2A and 2B, or the acoustic receiver modules 240 of FIGS. 2C and 3.

At block 515, the device may select one of the other devices based at least in part on the received second modulated ultrasonic signal. In various embodiments, the operations of block 510 are performed by the controller module 220 of FIG. 2A, 2B, or 2C, or the ultrasonic controller module 221 of FIG. 2B, 2C, or 3.

Figure 6:
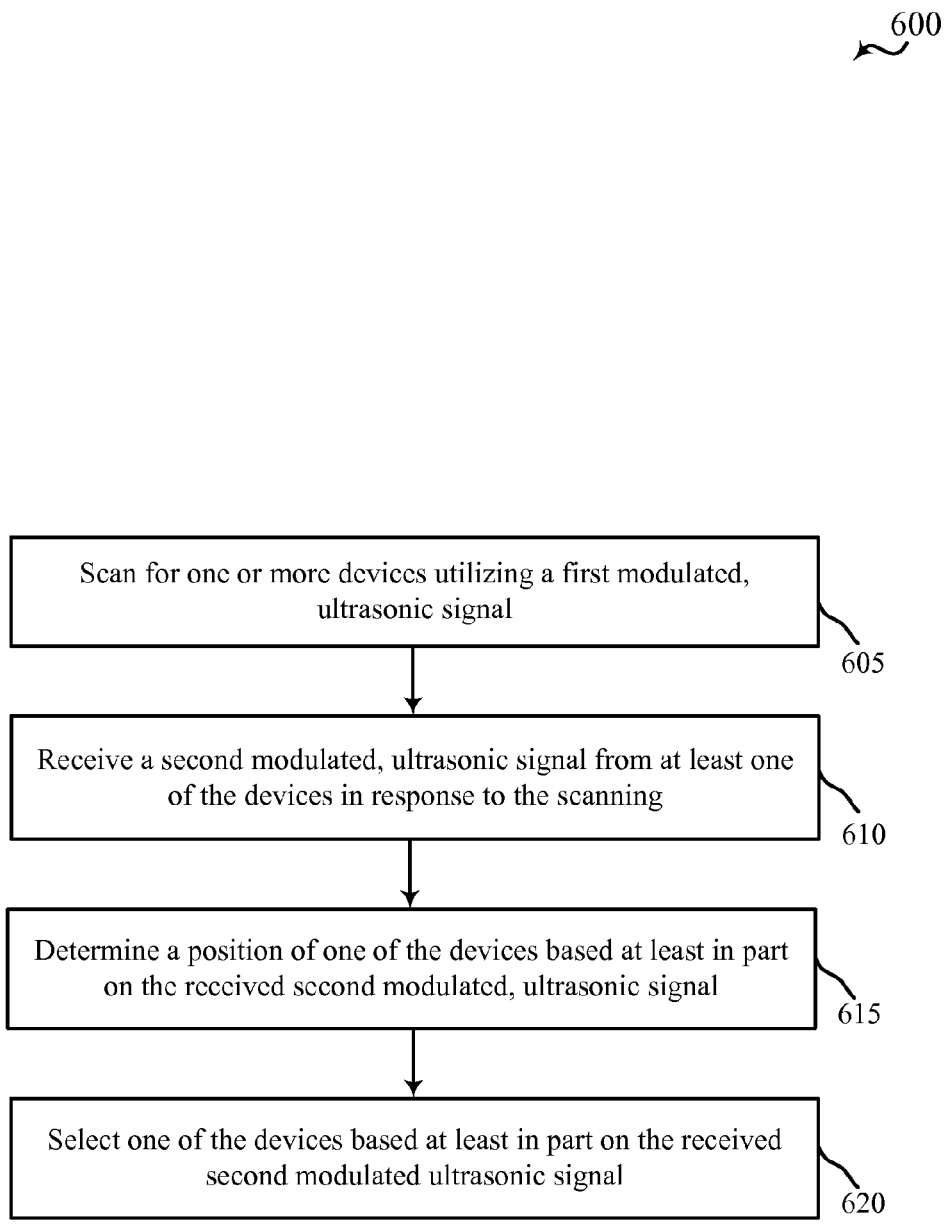
FIG. 6 is a flow diagram illustrating a method for communicating in a wireless network according to various embodiments.

Next, FIG. 6 depicts a flow diagram 600 of a method for communicating in a wireless network according to various embodiments. The flow diagram 600 may illustrate an example of the method described with reference to FIG. 5. The method of 600 may be implemented by one or more devices 115 described with reference to FIGS. 1A, 1B, 2A, 2B, 2C, 3, and 4.

At block 605, a first device may scan for one more other devices utilizing a first modulated, ultrasonic signal. Scanning may include transmitting or broadcasting a signal from a wideband speaker or an ultrasonic transducer. The operations of block 605 are, in some cases, performed by the transmitter modules 230 of FIG. 2A or 2B, or the acoustic transmitter modules 260 of FIG. 2C or 3.

At block 610, the device may receive a second modulated, ultrasonic signal from at least one the other devices in response to the scanning. Receiving may include receiving a signal via a wideband microphone or an ultrasonic transducer. The operations of block 610 may be performed, for example, by the receiver modules 210 of FIGS. 2A and 2B, or the acoustic receiver modules 240 of FIGS. 2C and 3.

At block 615, the device may determine a position of one or more of the other devices based at least in part on the received second modulated, ultrasonic signal. The operations of the block 615 may be performed by the controller module 220 of FIG. 2A, 2B, or 2C, or the ultrasonic controller module 221 of FIG. 2B, 2C, or 3, or the position module 225 of FIG. 2B

At block 620, the device may select one of the other devices based at least in part on the received second modulated ultrasonic signal. Selecting one of the other devices may be based at least in part on the determined position of the other device. In various embodiments, the operations of block 510 are performed by the controller module 220 of FIG. 2A, 2B, or 2C, or the ultrasonic controller module 221 of FIG. 2B, 2C, or 3, or the selection module 223 of FIG. 2B.

Figure 7:
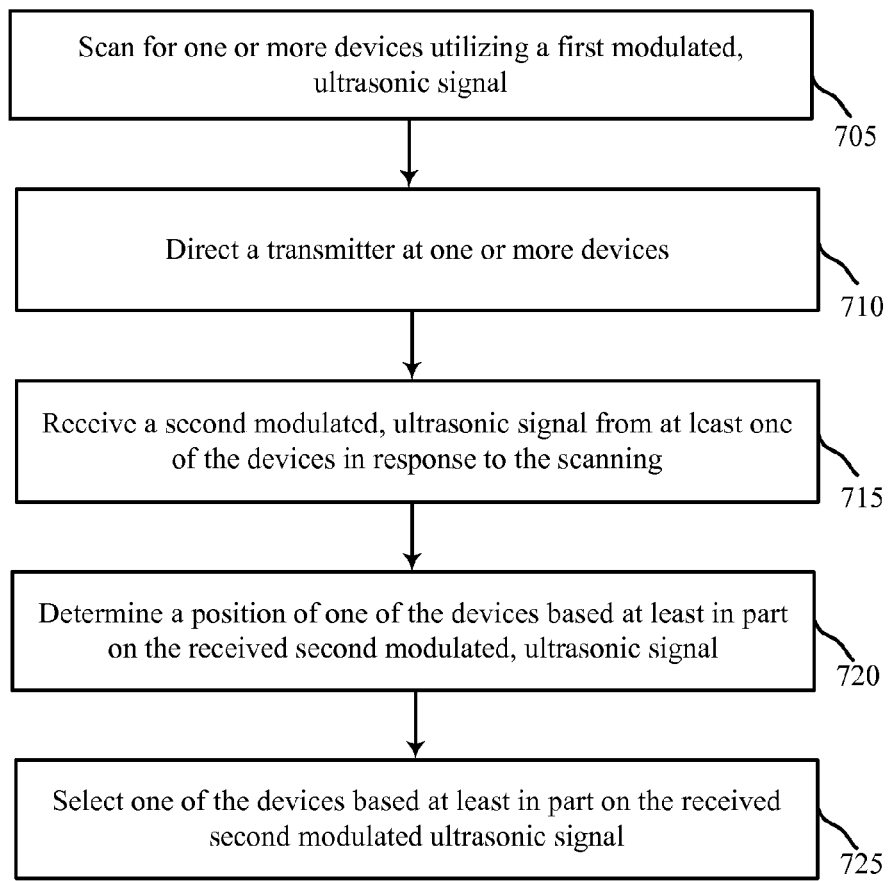
FIG. 7 is a flow diagram illustrating a method for communicating in a wireless network according to various embodiments.

Next, FIG. 7 depicts a flow diagram 700 of a method for communicating in a wireless network according to various embodiments. The flow diagram 700 may illustrate an example of the method or methods described with reference to FIGS. 5 and 6. The method of 700 may be implemented by one or more devices 115 described with reference to FIGS. 1A, 1B, 2A, 2B, 2C, 3, and 4.

At block 705, a first device may scan for one more other devices utilizing a first modulated, ultrasonic signal. Scanning may include transmitting or broadcasting a signal from a wideband speaker or ultrasonic transducer. The operations of block 705 are, in some cases, performed by the transmitter modules 230 of FIG. 2A or 2B, or the acoustic transmitter modules 260 of FIG. 2C or 3.

At block 710, a transmitter or the first device may be directed, for example, at one of the other devices. The operations of block 710 may be performed by the controller module 220 of FIG. 2A, 2B, or 2C, or the ultrasonic controller module 221 of FIG. 2B, 2C, or 3, or the position module 225 of FIG. 2B. In some embodiments, the operations of block 710 are performed by the processor module 370 of FIG. 3.

At block 715, the device may receive a second modulated, ultrasonic signal from at least one the other devices in response to the scanning. Receiving may include receiving a signal via a wideband microphone or ultrasonic transducer. The operations of block 715 may be performed, for example, by the receiver modules 210 of FIGS. 2A and 2B, or the acoustic receiver modules 240 of FIGS. 2C and 3.

At block 720, the device may determine a position of one or more of the other devices based at least in part on the received second modulated, ultrasonic signal. The operations of the block 720 may be performed by the controller module 220 of FIG. 2A, 2B, or 2C, or the ultrasonic controller module 221 of FIG. 2B, 2C, or 3, or the position module 225 of FIG. 2B.

At block 725, the device may select one of the other devices based at least in part on the received second modulated ultrasonic signal. Selecting one of the other devices may be based at least in part on the determined position of the other device. In various embodiments, the operations of block 725 are performed by the controller module 220 of FIG. 2A, 2B, or 2C, or the ultrasonic controller module 221 of FIG. 2B, 2C, or 3, or the selection module 223 of FIG. 2B.

Figure 8:
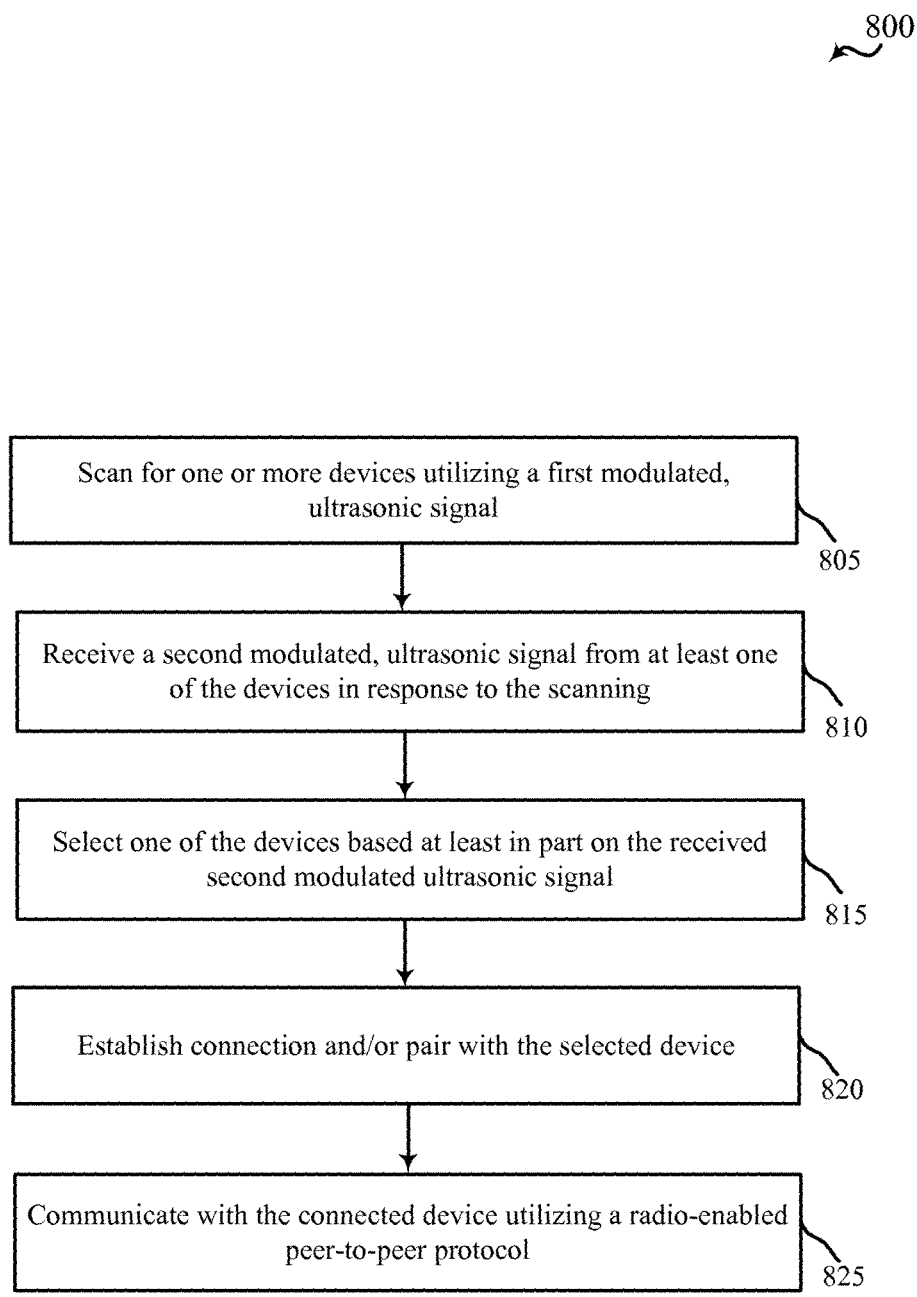
FIG. 8 is a flow diagram illustrating a method for communicating in a wireless network according to various embodiments.

FIG. 8 depicts a flow diagram 800 of a method for communicating in a wireless network according to various embodiments. The flow diagram 800 may illustrate an example of the method or methods described with reference to FIGS. 5, 6, and 7. The method of 800 may be implemented by one or more devices 115 described with reference to FIGS. 1A, 1B, 2A, 2B, 2C, 3, and 4.

At block 805, a first device may scan for one more other devices utilizing a first modulated, ultrasonic signal. Scanning may include transmitting or broadcasting a signal from a wideband speaker or ultrasonic transducer. The operations of block 805 are, in some cases, performed by the transmitter modules 230 of FIG. 2A or 2B, or the acoustic transmitter modules 260 of FIG. 2C or 3.

At block 810, the device may receive a second modulated, ultrasonic signal from at least one the other devices in response to the scanning. Receiving may include receiving a signal via a wideband microphone. The operations of block 810 may be performed by, for example, the receiver modules 210 of FIGS. 2A and 2B, or the acoustic receiver modules 240 of FIGS. 2C and 3.

At block 815, the device may select one of the other devices based at least in part on the received second modulated ultrasonic signal. In various embodiments, the operations of block 815 are performed by the controller module 220 of FIG. 2A, 2B, or 2C, or the ultrasonic controller module 221 of FIG. 2B, 2C, or 3, or the selection module 223 of FIG. 2B.

At block 820, the first device may establish a connection and/or pair with the selected device. In various embodiments, the operations of block 820 are performed by the controller module 220 of FIG. 2A, 2B, or 2C, or the ultrasonic controller module 221 of FIG. 2B, 2C, or 3, or the connection establishment module 227 of FIG. 2B.

At block 825, the first device may communicate with the connected device utilizing a radio-enabled peer-to-peer protocol. The operations of block 825 are, in some instances, performed by the receiver modules 210 and the transmitter modules 230 of FIG. 2A or 2B, or the WLAN/WPAN transmitter module 280 of FIG. 2C, or the WLAN/WPAN transceiver module(s) 310 of FIG. 3.

Those skilled in the art will recognize that the methods 500, 600, 700, and 800 are example implementations of the tools and techniques described herein. The methods may be performed with more or fewer steps; and they may be performed in an order other than indicated.

The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of communicating in a wireless communication network, the method comprising:
    transmitting, by a device that supports signal exchange via both modulated, ultrasonic acoustic signals and radio-enabled electromagnetic signals, a first modulated, ultrasonic acoustic signal including identification information about the device;
    receiving, by the device, one or more second modulated, ultrasonic acoustic signals from one or more other devices in response to the first modulated, ultrasonic acoustic signal, each of the one or more second modulated, ultrasonic acoustic signals including identification information about a respective one of the one or more other devices;
    selecting, by the device, one of the one or more other devices based at least in part on the one or more second modulated, ultrasonic acoustic signals; and
    performing a registration process with the selected one of the one or more other devices utilizing electromagnetic signals of a radio-enabled peer-to-peer protocol for establishing a connection with the selected one of the one or more other devices, the registration process based at least in part on the identification information about the selected one of the one or more other devices.

2. The method of claim 1, further comprising:
    determining a position of one of the one or more other devices based at least in part on the one or more second modulated, ultrasonic acoustic signals.

3. The method of claim 2, wherein selecting one of the one or more other devices is based at least in part on the determined position.

4. The method of claim 1, wherein performing the registration process with the selected one of the one or more other devices is based at least in part on a third modulated, ultrasonic acoustic signal.

5. The method of claim 4, further comprising:
    exchanging a personal identification number (PIN) code via the third modulated, ultrasonic acoustic signal.

6. The method of claim 1, further comprising:
    directing a transmitter at one or more devices.

7. The method of claim 1, wherein the transmitting comprises transmitting the first modulated, ultrasonic acoustic signal via a wideband speaker that supports transmitting sonic acoustic signals and ultrasonic acoustic signals.

8. The method of claim 1, wherein the receiving comprises receiving the one or more second modulated, ultrasonic acoustic signals via a wideband microphone that supports receiving sonic acoustic signals and ultrasonic acoustic signals.

9. The method of claim 1, wherein the transmitting comprises transmitting the first modulated, ultrasonic acoustic signal via a dedicated ultrasonic transducer.

10. The method of claim 1, wherein the receiving comprises receiving the one or more second modulated, ultrasonic acoustic signals via a dedicated ultrasonic transducer.

11. The method of claim 1, wherein performing the registration process with the selected one of the one or more other devices utilizing electromagnetic signals of the radio-enabled peer-to-peer protocol comprises:
    exchanging the identification information about the device, the identification information about the selected one of the one or more other devices, or additional identification information transmitted by the device via a third modulated, ultrasonic signal, for authenticating or associating the device with the selected one of the one or more other devices.

12. The method of claim 1, further comprising:
    performing a handshake operation of the radio-enabled peer-to-peer protocol to establish credentials for the connection with the selected one of the one or more other devices, the handshake operation based at least in part on the identification information about the device, the identification information about the selected one of the one or more other devices, or additional identification information transmitted by the device via a third modulated, ultrasonic signal.

13. A device for communicating in a wireless communication network, the device comprising:
    means for transmitting a first modulated, ultrasonic acoustic signal including identification information about the device;
    means for receiving one or more second modulated, ultrasonic acoustic signals from one or more other devices in response to the first modulated, ultrasonic acoustic signal, each of the one or more second modulated, ultrasonic acoustic signals including identification information about a respective one of the one or more other devices;
    means for selecting one of the one or more other devices based at least in part on the one or more second modulated, ultrasonic acoustic signals; and
    means for performing a registration process with the selected one of the one or more other devices utilizing electromagnetic signals of a radio-enabled peer-to-peer protocol for establishing a connection with the selected one of the one or more other devices, the registration process based at least in part on the identification information about the selected one of the one or more other devices.

14. The device of claim 13, further comprising:
    means for determining a position of one of the one or more other devices based at least in part on the one or more second modulated, ultrasonic acoustic signals.

15. The device of claim 14, wherein the means for selecting one of the one or more other devices is operable based at least in part on the determined position.

16. The device of claim 13, wherein the means for performing the registration process with the selected one of the one or more other devices is operable based at least in part on a third modulated, ultrasonic acoustic signal.

17. The device of claim 16, further comprising:
means for exchanging a personal identification number (PIN) code via the third modulated, ultrasonic acoustic signal.

18. The device of claim 13, further comprising:
means for directing the means for transmitting at one or more devices.

19. The device of claim 13, wherein the means for transmitting comprises a wideband speaker that supports transmitting sonic acoustic signals and ultrasonic acoustic signals.

20. The device of claim 13, wherein the means for receiving comprises a wideband microphone that supports receiving sonic acoustic signals and ultrasonic acoustic signals.

21. The device of claim 13, wherein one or both of the means for transmitting or the means for receiving comprises a dedicated ultrasonic transducer.

22. An apparatus that supports signal exchange via both modulated, ultrasonic acoustic signals and radio-enabled electromagnetic signals for communicating in a wireless communication network, the apparatus comprising:
a processor;
memory in electronic communication with the processor; and
instructions stored in the memory, the instructions being executable by the processor to cause the apparatus to:
transmit a first modulated, ultrasonic acoustic signal including identification information about the apparatus;
receive one or more second modulated, ultrasonic acoustic signals from one or more other devices in response to the first modulated, ultrasonic acoustic signal, each of the one or more second modulated, ultrasonic acoustic signals including identification information about a respective one of the one or more other devices;
select one of the one or more other devices based at least in part on the one or more second modulated, ultrasonic acoustic signals; and
perform a registration process with the selected one of the one or more other devices utilizing electromagnetic signals of a radio-enabled peer-to-peer protocol for establishing a connection with the selected one of the one or more other devices, the registration process based at least in part on the identification information about the selected one of the one or more other devices.

23. The apparatus of claim 22, wherein the instructions are executable by the processor to cause the apparatus to:
determine a position of one of the one or more other devices based at least in part on the one or more second modulated, ultrasonic acoustic signals.

24. The apparatus of claim 23, wherein the instructions are executable by the processor to cause the apparatus to:
select one of the one or more other devices based at least in part on the determined position.

25. The apparatus of claim 22, wherein the instructions are executable by the processor to cause the apparatus to:
perform the registration process with the selected one of the one or more other devices based at least in part on a third modulated, ultrasonic acoustic signal.

26. The apparatus of claim 25, wherein the instructions are executable by the processor to cause the apparatus to:
exchange a personal identification number (PIN) code via the third modulated, ultrasonic acoustic signal.

27. The apparatus of claim 22, wherein the instructions are executable by the processor to cause the apparatus to:
direct a transmitter at one or more devices.

28. The apparatus of claim 22, wherein the instructions are executable by the processor to cause the apparatus to:
transmit the first modulated, ultrasonic acoustic signal via a wideband speaker that supports transmitting sonic acoustic signals and ultrasonic acoustic signals.

29. The apparatus of claim 22, wherein the instructions are executable by the processor to cause the apparatus to:
receive the one or more second modulated, ultrasonic acoustic signals via a wideband microphone that supports receiving sonic acoustic signals and ultrasonic acoustic signals.

30. The apparatus of claim 22, wherein the instructions are executable by the processor to cause the apparatus to:
transmit the first modulated, ultrasonic acoustic signal via a dedicated ultrasonic transducer.

31. The apparatus of claim 22, wherein the instructions to perform the registration process with the selected one of the one or more other devices utilizing electromagnetic signals of the radio-enabled peer-to-peer protocol are executable by the processor to cause the apparatus to:
exchange the identification information about the apparatus, the identification information about the selected one of the one or more other devices, or additional identification information transmitted by the device via a third modulated, ultrasonic signal, for authenticating or associating the apparatus with the selected one of the one or more other devices.

32. The apparatus of claim 22, wherein the instructions are executable by the processor to cause the apparatus to:
perform a handshake operation of the radio-enabled peer-to-peer protocol to establish credentials for the connection with the selected one of the one or more other devices, the handshake operation based at least in part on the identification information about the apparatus, the identification information about the selected one of the one or more other devices, or additional identification information transmitted by the apparatus via a third modulated, ultrasonic signal.

33. A non-transitory computer readable medium storing code comprising instructions executable by a processor to cause a device that supports signal exchange via both modulated, ultrasonic acoustic signals and radio-enabled electromagnetic signals to:
transmit a first modulated, ultrasonic acoustic signal including identification information about the device;
receive one or more second modulated, ultrasonic acoustic signals from one or more other devices in response to the first modulated, ultrasonic acoustic signal, each of the one or more second modulated, ultrasonic acoustic signals including identification information about a respective one of the one or more other devices; and
select one of the one or more other devices based at least in part on the one or more second modulated, ultrasonic acoustic signals; and
perform a registration process with the selected one of the one or more other devices utilizing electromagnetic signals of a radio-enabled peer-to-peer protocol for establishing a connection with the selected one of the one or more other devices, the registration process based at least in part on the identification information about the selected one of the one or more other devices.

34. The non-transitory computer-readable medium of claim 33, wherein the instructions are executable by a processor to cause the device to:
determine a position of one of the one or more other devices based at least in part on the one or more second modulated, ultrasonic acoustic signals.

35. The non-transitory computer-readable medium of claim 34, wherein the instructions are executable by a processor to cause the device to:
select one of the one or more other devices based at least in part on the determined position.

36. The non-transitory computer-readable medium of claim 33, wherein the instructions are executable by a processor to cause the device to:
perform the registration process with the selected one of the one or more other devices based at least in part on a third modulated, ultrasonic acoustic signal.

37. The non-transitory computer-readable medium of claim 36, wherein the instructions are executable by a processor to cause the device to:
exchange a personal identification number (PIN) code via the third modulated, ultrasonic acoustic signal.

38. The non-transitory computer-readable medium of claim 33, wherein the instructions are executable by a processor to cause the device to:
direct a transmitter at one or more devices.

39. The non-transitory computer-readable medium of claim 33, wherein the instructions are executable by a processor to cause the device to:
transmit the first modulated, ultrasonic acoustic signal via a wideband speaker that supports transmitting sonic acoustic signals and ultrasonic acoustic signals.

40. The non-transitory computer-readable medium of claim 33, wherein the instructions are executable by a processor to cause the device to:
receive the one or more second modulated, ultrasonic acoustic signals via a wideband microphone that supports receiving sonic acoustic signals and ultrasonic acoustic signals.

* * * * *